(12) United States Patent
Hopkins et al.

(10) Patent No.: US 9,649,575 B2
(45) Date of Patent: May 16, 2017

(54) ORGANIC OIL EXTRACTION DEVICE

(71) Applicant: Puretane, Inc., Newport Beach, CA (US)

(72) Inventors: Adam Hopkins, Santa Monica, CA (US); Babek Khamenian, Irvine, CA (US)

(73) Assignee: HOPKINS HOLDINGS LLC, Santa Monica, CA (US)

( * ) Notice: Subject to any disclaimer, the term of this patent is extended or adjusted under 35 U.S.C. 154(b) by 332 days.

(21) Appl. No.: 14/476,099

(22) Filed: Sep. 3, 2014

(65) Prior Publication Data

US 2016/0059149 A1   Mar. 3, 2016

(51) Int. Cl.
*B01D 11/02*   (2006.01)

(52) U.S. Cl.
CPC ...... *B01D 11/0207* (2013.01); *B01D 11/0219* (2013.01); *B01D 11/0292* (2013.01)

(58) Field of Classification Search
CPC .................. B01D 11/0207; B01D 11/0292
See application file for complete search history.

(56) References Cited

U.S. PATENT DOCUMENTS

| | | | |
|---|---|---|---|
| 5,252,729 A | 10/1993 | De Crosta et al. | |
| 5,281,732 A | 1/1994 | Franke | |
| 5,516,923 A | 5/1996 | Hebert et al. | |
| 5,525,746 A | 6/1996 | Franke | |
| 5,711,856 A * | 1/1998 | Nakajima | B01D 11/0215 159/22 |
| 5,998,640 A | 12/1999 | Haefele et al. | |
| 6,450,935 B1 | 9/2002 | Haworth | |
| 6,569,480 B2 | 5/2003 | Hall et al. | |
| 6,710,216 B1 | 3/2004 | Corr | |
| 6,890,424 B1 | 5/2005 | Wilde | |
| 7,485,207 B2 | 2/2009 | Corr et al. | |
| 2004/0049059 A1 | 3/2004 | Mueller | |
| 2004/0147769 A1 | 7/2004 | Davis | |
| 2008/0128261 A1 | 6/2008 | Balass | |
| 2010/0081836 A1 | 4/2010 | Parslow et al. | |
| 2011/0133120 A1 | 6/2011 | McGee | |
| 2014/0114084 A1 | 4/2014 | Hamler et al. | |
| 2014/0220646 A1* | 8/2014 | Lim | C05F 17/0276 435/134 |

FOREIGN PATENT DOCUMENTS

WO   WO0204580   1/2002

OTHER PUBLICATIONS

Instructables, Butane Recovery, Dec. 27, 2009 http://www.instructables.com/community/Butane-recovery/.
Growgreenerguru, Honey Oil (Butane Hash), Mar. 2012 http://www.growgreenerguru.com/2012/03/honey-oil-butane-hash/.
Maverick, YouTube, Closed Loop BHO Extraction RSO activated hash oil, May 9, 2014 https://www.youtube.com/watch?v=bOux-xeWEF4.
Webstaurant Store, Portable Gas Stove / Butane Burner with 1 Range, Catalog, Mar. 1, 2010 http://www.webstaurantstore.com/portable-gas-stove-burner-with-1-range/472E10SL.html?utm_source=Google&utm_medium=cpc&utm_campaign=GoogleShopping&gclid=CNL73p-LoL8CFUIQ7AidES4ASA.

* cited by examiner

*Primary Examiner* — Randy Boyer
(74) *Attorney, Agent, or Firm* — Hankin Patent Law, APC; Kevin Schraven; Anooj Patel

(57) ABSTRACT

An organic oil extraction device. The oil extraction device may comprise: one or more connection ports; a first chamber; a second chamber; a heat source; one or more vacuum pumps; and a burner assembly. The one or more connection ports may receive one or more sources of pressurized butane liquid. The first chamber may receive an organic matter and butane liquid from the one or more sources of pressurized butane liquid. The butane liquid may enter the first chamber, passes through the organic matter, and extracts an organic oil from the organic matter to create a butane liquid and organic extract. The butane liquid and organic extract may enter and accumulate in the second chamber. The heat source may heat the butane liquid and organic extract such that the butane liquid is converted into a butane gas. The one or more vacuum pumps may extract the butane gas from the second chamber, and the burner assembly may burn off the extracted butane gas.

14 Claims, 5 Drawing Sheets

ORGANIC OIL EXTRACTION DEVICE

FIELD OF USE

The present disclosure generally relates to organic oil extraction devices and methods. More particularly, the present disclosure relates to closed loop oil extraction devices with burn off mechanisms and methods for extracting butane hash oil from organic matter such as *cannabis* plant matter.

BACKGROUND

Hash oil, which is usually a composition extracted from the *cannabis* plant, is generally known to be amongst the most potent of *cannabis* products due to its highly concentrated Tetrahydrocannabinol ("THC") content. Because hash oil has a high THC concentration, hash oil typically creates a faster and more powerful relief to medical patients than its more traditional plant form. Medical patients also usually prefer hash oil over its traditional plant form because hash oil can be smoked more discreetly with the use of small vaporizing pens.

Hash oil is generally manufactured by solvent extraction using solvents such as butane, and the extraction typically occurs in either a closed loop system or an open loop system. In an open loop system, *cannabis* plant matter is stored in a tube, and butane liquid preferably passes through the tube to create a raw mixture of both butane liquid and hash oil. This raw mixture is then preferably purified, or "purged" of any remaining butane, by placing the raw mixture in a vacuum chamber or hot water bath, which causes the excess butane to escape into the surrounding environment.

In a closed loop system, butane gas typically does not leave the system and is usually recaptured in a tank, so that the butane can be re-used. However, closed loop systems generally have a downside in that, although a closed loop system is generally much safer than an open loop system, closed loop systems usually tend to be more expensive than open loop systems.

In general, butane is a highly flammable solvent that is very dangerous for those who attempt to perform an open loop extraction. However, due to the growing demand for butane hash oil ("BHO"), many inexperienced people have already begun manufacturing BHO in their homes. Further, due to cost concerns, these inexperienced manufacturers tend to disregard the risks involved and generally opt for the less expensive, open loop system method for manufacturing BHO. Regardless, there are significant safety concerns when purging the raw mixture when making BHO. Specifically, because butane is heavier than air, it tends to sink and puddle on the ground. Given butane's flammable characteristics, even the slightest spark can cause the butane to ignite, thereby creating an explosion. The resulting explosion when creating BHO not only cause serious injuries and property damage, but may also lead to problems with law enforcement due to possible confusion with bomb-making activities.

Residential or personal production of BHO is also troublesome because unregulated production of BHO can result with the manufacturing of unrefined BHO. This impure form of BHO can expose consumers to significant health risks if ingested and is generally the result of poor workmanship or improper materials, which also may leave a chemical residue on the BHO during the extraction step.

Therefore, there is a need for an improved device and method for manufacturing BHO. Preferably the new device and method will be efficient, affordable, and used in a closed loop system to promote the safer manufacturing of BHO.

SUMMARY

To minimize the limitations in the prior art, and to minimize other limitations that will become apparent upon reading and understanding the present specification, the following discloses a new and improved organic oil extraction device for extracting oils from an organic matter.

One embodiment may be an organic oil extraction device comprising: one or more connection ports; a first chamber; a second chamber; a heat source; one or more vacuum pumps; and a burner assembly; wherein the one or more connection ports are configured to receive one or more sources of pressurized butane liquid; wherein the first chamber is configured to receive an organic matter and butane liquid from the one or more sources of pressurized butane liquid; wherein the butane liquid enters the first chamber, passes through the organic matter, and extracts an organic oil from the organic matter to create a butane liquid and organic extract; wherein the butane liquid and organic extract enters and accumulates in the second chamber; wherein the heat source heats the butane liquid and organic extract such that the butane liquid is converted into a butane gas; wherein the one or more vacuum pumps extract the butane gas from the second chamber; and wherein the burner assembly is configured to burn off the extracted butane gas. The burner assembly may comprise: a pilot; a butane gas sensor; a flame sensor; and a burner; wherein the pilot may be configured to ignite a flame when the butane gas sensor detects the extracted butane gas; and wherein, when the flame sensor may detect the flame, the burner burns the extracted butane gas. The organic oil extraction device may further comprise: a gas leak sensor; and a system controller; wherein the gas leak sensor may be configured to detect a gas leak of the butane gas; and wherein the system controller may shut off the organic oil extraction device when the gas leak sensor detects the gas leak. The organic oil extraction device may further comprise: a liquid pressure sensor; and a valve controller; wherein the liquid pressure sensor may detect a sufficient amount of the butane liquid at the one or more connection ports; wherein the one or more connection ports may comprise one or more port valves; wherein the valve controller may be configured to control the one or more port valves to regulate the sufficient amount of the butane liquid to be released to the first chamber. The heat source may be a heat blanket configured to regulate an amount of heat to be emitted in the second chamber. The organic oil extraction device may further comprise: a heat controller; wherein the heat controller may be configured to regulate the heating of the heat source. The organic oil extraction device may further comprise: one or more vacuum pump controllers; wherein the one or more vacuum pump controllers may be configured to regulate the extraction of butane gas by the one or more vacuum pumps. The one or more vacuum pumps may comprise one or more first vacuum pumps; wherein the one or more first vacuum pumps may be configured to perform the butane gas extraction in the second chamber. The one or more vacuum pumps may comprise one or more second vacuum pumps; wherein the one or more second vacuum pumps may be configured to perform a residual butane gas extraction in the second chamber. The first chamber may comprise a filter for separating the butane liquid and organic extract from the organic matter when the butane liquid passes through the organic matter.

Another embodiment may be an organic oil extraction device, comprising: one or more connection ports; a first chamber; a second chamber; a filter; a heat blanket; one or more vacuum pumps; and a burner assembly; wherein the one or more connection ports are configured to receive one or more sources of pressurized butane liquid; wherein the first chamber is configured to receive an organic matter and a butane liquid from the one or more sources of pressurized butane liquid; wherein the butane liquid enters the first chamber, passes through the organic matter, and extracts an organic oil from the organic matter to create a butane liquid and organic extract; wherein the first chamber comprises the filter for separating the butane liquid and organic extract from the organic matter; wherein the butane liquid and organic extract enters and accumulates in the second chamber; wherein the heat blanket heats the second chamber and the butane liquid and organic extract such that the butane liquid is converted into a butane gas inside the second chamber; wherein the one or more vacuum pumps extract the butane gas from the second chamber; wherein the one or more controllers regulates the heat blanket and the one or more vacuum pumps; and wherein the burner assembly is configured to burn off the extracted butane gas. The burner assembly may comprise: a pilot; a butane gas sensor; a flame sensor; and a burner; wherein the pilot may be configured to ignite a flame when the butane gas sensor detects the extracted butane gas; and wherein, when the flame sensor may detect the flame, the burner burns the extracted butane gas. The organic oil extraction device may further comprise: a gas leak sensor; and a system controller; wherein the gas leak sensor may be configured to detect a gas leak of the butane gas; and wherein the system controller may shut off the organic oil extraction device when the gas leak sensor detects the gas leak. The organic oil extraction device may further comprise: a liquid pressure sensor; and a valve controller; wherein the liquid pressure sensor may detect a sufficient amount of the butane liquid at the one or more connection ports; wherein the one or more connection ports may comprise one or more port valves; wherein the valve controller may be configured to control the one or more port valves to regulate the sufficient amount of the butane liquid to be released to the first chamber. The organic oil extraction device may further comprise: a heat controller; wherein the heat controller may be configured to regulate the heating of the heat blanket. The organic oil extraction device may further comprise: one or more vacuum pump controllers; wherein the one or more vacuum pump controllers may be configured to regulate the extraction of butane gas by the one or more vacuum pumps. The one or more vacuum pumps may comprise one or more first vacuum pumps; wherein the one or more first vacuum pumps may be configured to perform the butane gas extraction in the second chamber. The one or more vacuum pumps may comprise one or more second vacuum pumps; wherein the one or more second vacuum pumps may be configured to perform a residual butane gas extraction in the second chamber. The one or more first vacuum pumps may perform the butane gas extraction in the second chamber after a predetermined amount of time; wherein the heat blanket may be configured to heat the butane liquid and organic extract after the one or more first vacuum pumps perform the butane gas extraction; and wherein the one or more second vacuum pumps may be configured to perform the residual butane gas extraction after the heat blanket heats the butane liquid and organic extract.

Another embodiment may be an organic oil extraction device comprising: one or more connection ports; a liquid pressure sensor; a valve controller; a first chamber; a second chamber; a heat blanket; a heat controller; one or more vacuum pumps; one or more vacuum pump controllers; a burner assembly; a gas leak sensor; a system controller; wherein the one or more connection ports are configured to receive one or more sources of pressurized butane liquid; wherein the liquid pressure sensor detects a sufficient amount of the butane liquid at the one or more connection ports; wherein the one or more connection ports comprise one or more port valves; wherein the valve controller is configured to control the one or more port valves to regulate the sufficient amount of the butane liquid to be released to the first chamber; wherein the first chamber is configured to receive an organic matter and butane liquid from the one or more sources of pressurized butane liquid; wherein the butane liquid enters the first chamber, passes through the organic matter, and extracts an organic oil from the organic matter to create a butane liquid and organic extract; wherein the first chamber comprises a filter for separating the butane liquid and organic extract from the organic matter when the butane liquid passes through the organic matter; wherein the butane liquid and organic extract enters and accumulates in the second chamber; wherein the heat blanket heats the butane liquid and organic extract such that the butane liquid is converted into a butane gas; wherein the heat controller is configured to regulate the heating of the heat blanket; wherein the gas leak sensor is configured to detect a gas leak of the butane gas; wherein the system controller shuts off the organic oil extraction device when the gas leak sensor detects the gas leak; wherein the one or more vacuum pumps extract the butane gas from the second chamber; wherein the one or more vacuum pump controllers are configured to regulate the extraction of butane gas by the one or more vacuum pumps; wherein the one or more vacuum pumps comprise one or more first vacuum pumps and one or more second vacuum pumps; wherein the one or more first vacuum pumps are configured to perform the butane gas extraction in the second chamber; wherein the one or more second vacuum pumps are configured to perform a residual butane gas extraction in the second chamber; wherein the burner assembly comprises: a pilot; a butane gas sensor; a flame sensor; and a burner; wherein the pilot is configured to ignite a flame when the butane gas sensor detects the extracted butane gas; and wherein, when the flame sensor detects the flame, the burner burns the extracted butane gas.

It is an object to provide an oil extraction device with a plurality of safety measures. Such safety measures may include: a gas leak sensor, a liquid pressure sensor, a gas pressure sensor, and a flame sensor. The gas leak sensor may run throughout the entire method in order to monitor whether there is a butane gas leak, signaling the system controller to shut down the closed loop oil extraction device if a leak is detected. The liquid pressure sensor may function so as to regulate the flow of butane into the first chamber or filter chamber. The gas pressure sensor may function so as to regulate the gas pilot pipe and gas pilot igniter. The flame sensor may confirm proper ignition of the gas burner and the presence of a flame. Once the flame is confirmed, the system controller may signal to allow the remaining butane to enter the butane gas pipe where the gas burner burns remaining the butane. The aforementioned safety measures may be in place to protect against accidental ignition and preventing an unwelcomed explosion.

Previous devices for oil extraction have been primarily of two different methods: 1) open loop extraction and 2) closed loop extraction. Open loop hash oil extraction with butane is generally considered extremely unsafe because butane is a highly flammable substance and is heavier than air. Thus, when butane exits an open loop oil extraction system, it tends to pool on the ground, wherein even a slight spark can cause an explosion. Although this risk of explosion can be lessened through the use of closed loop extraction devices, existing closed loop devices for this method of extraction are usually very expensive, as closed loop devices are generally custom made from parts that were originally meant for other purposes. Thus, it is an object to provide an oil extraction device that is inexpensive and is able to minimize the high risk associated with open loop methods for extracting hash oil.

The use of unregulated and untested devices can increase the risk to consumers. For example, unregulated devices may use improper materials, resulting in impurities in the produced BHO, which may ultimately cause health issues towards consumers. Therefore, it is an object to provide an oil extraction device with safety measures to prevent any risk associated with existing methods of manufacturing hash oil.

It is an object to provide a device which will promote a safer method for extraction of BHO from *cannabis* plant matter.

It is an object to provide a device which may be mass produced at a lower cost than the prior art.

It is an object to overcome the limitations of the prior art.

Additional embodiments of the invention will be understood from the detailed description of the illustrative embodiments.

BRIEF DESCRIPTION OF THE DRAWING

The figures are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

In the following detailed description numerous specific details are set forth in order to provide a thorough understanding of various aspects of one or more embodiments. However, one or more embodiments may be practiced without some or all of these specific details. In other instances, well-known methods, procedures, and/or components have not been described in detail so as not to unnecessarily obscure aspects of embodiments.

While multiple embodiments are disclosed, still other embodiments of the present disclosure will become apparent to those skilled in the art from the following detailed description, which shows and describes illustrative embodiments. As will be realized, the embodiments are capable of modifications in various obvious aspects, all without departing from the spirit and scope. Also, the reference or non-reference to a particular embodiment shall not be interpreted to limit the scope of protection.

In the following description, certain terminology is used to describe certain features of one or more embodiments. For example, as used herein, the term "butane" generally refers to any colorless flammable gas or solvent used as a solvent for organic oil extraction device disclosed herein. Butane may also refer to any other gas or solvent such as hextane, pentane, soybean oil, isopropyl, ethanol, petroleum ether, naptha, and the like.

Figure 1:
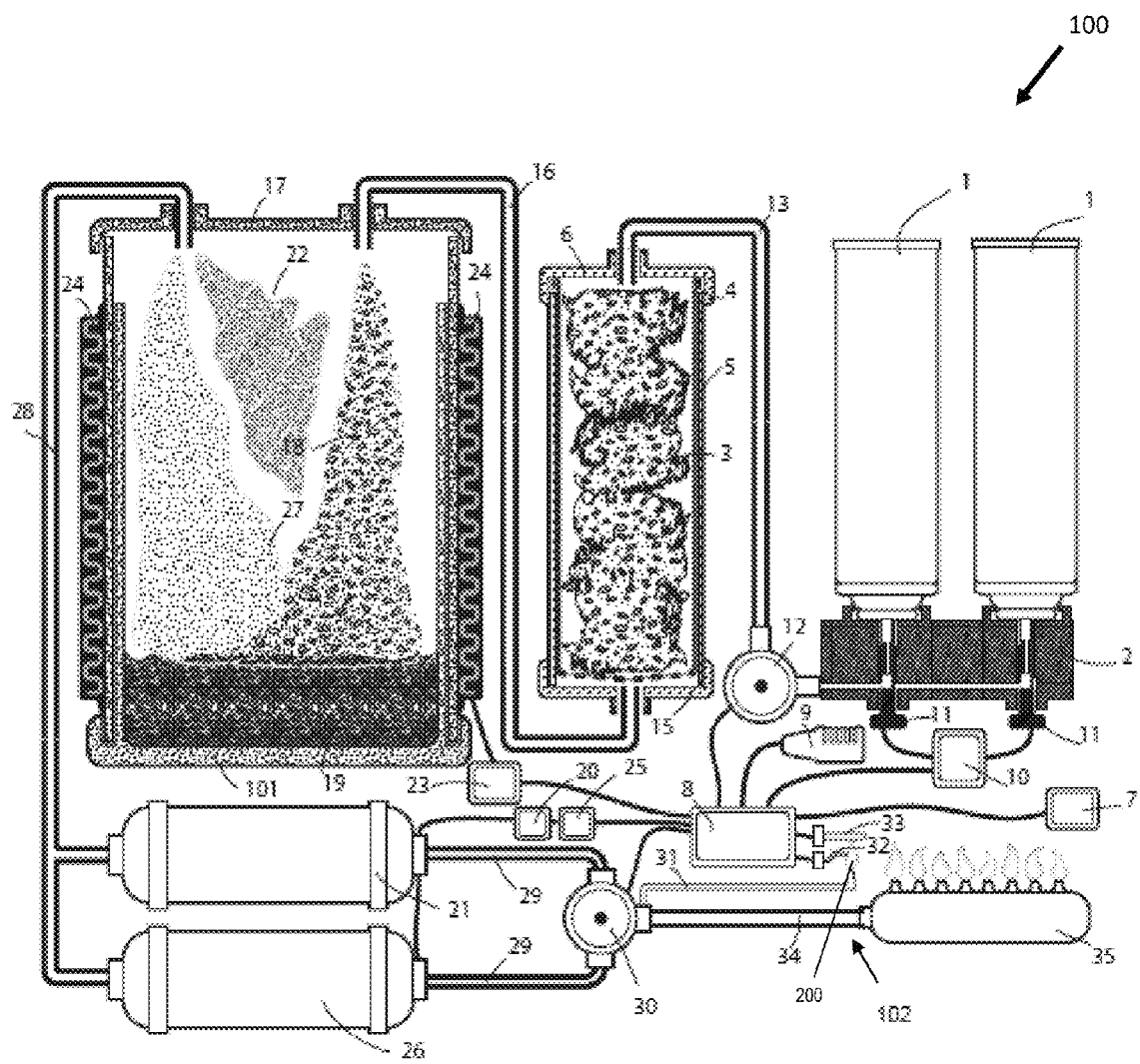
FIG. 1 is an illustration of one embodiment of an organic oil extraction device and shows the inner workings of the organic oil extraction device.

FIG. 1 is an illustration of one embodiment of an organic oil extraction device and shows the inner workings of the organic oil extraction device. As shown in FIG. 1, one embodiment of the organic oil extraction device 100 may comprise: butane tanks 1, connection ports 2, organic matter 3 that is put into the device 100, filter 4, first chamber 5, first chamber lid 6, start button 7, system controller 8, gas leak sensor 9, valve controller 10, port valves 11, liquid pressure sensor 12, butane liquid pipe 13, cap 15, butane liquid and organic extract pipe 16, second chamber lid 17, butane liquid and organic extract 18, second chamber 101, butane liquid and organic extract deposit 19 (i.e., butane hash oil), first vacuum pump controller 20, second vacuum pump controller 25, first vacuum pump 21, second vacuum pump 26, residual butane gas 22, heat blanket controller 23, heat blanket 24, butane gas 27, extracted butane gas pipe 28, and a burner assembly 102. The burner assembly 102 may comprise: first and second butane gas pipes 29, butane gas pressure and sensor 30, gas pilot pipe 31, gas pilot electric igniter 32, flame sensor 33, third butane gas pipe 34, and butane gas burner 35.

A user may begin the organic oil extraction process by first filling or installing the butane tanks 1 and inserting the organic matter 3 into the organic oil extraction device 100. The butane tanks 1 are generally one or more sources of pressurized butane liquid and may be installed into the organic oil extraction device 100 by installation into the connection ports 2. The organic matter 3 is generally any matter composed of organic compound and may be filled in the organic oil extraction device 100 by insertion into the first chamber 5. The user may first insert the organic matter 3 into the filter 4, and then insert both the organic matter 3 and filter 4 into the first chamber 5. In various embodiments, the filter 4 may be a separate piece or may be built into or part of the first chamber 5. Additionally, in alternate embodiments, the organic matter 3 may be placed into the first chamber 5 without the use of the filter 4. Examples of filters 4 may include, without limitation, screens, meshes, cartridges, centrifugal, sedimentation filters, and the like. Once the organic matter 3 is placed inside the first chamber 5, the user may close the first chamber lid 6 to seal the organic matter 3 in the first chamber 5. Cap 15 may alternatively be part of chamber 15, a separate part, and/or a filter cap.

The user may then initiate the oil extraction process by activating the organic oil extraction device 100. The user may begin the oil extraction process by activating a switch or by pressing the start button 7, which preferably communicates with the system controller 8.

In one embodiment, the system controller 8 may control and monitor all the processes of the organic oil extraction device 100, and once the organic oil extraction device 100 confirms that the organic oil extraction device 100 is closed and locked, the organic oil extraction device 100 may initiate the gas leak sensor 9, which may be configured to monitor throughout the procedure to detect any gas leak. In the event that the gas leak sensor 9 detects a gas leak, the gas leak sensor 9 may inform the system controller 8 to shut down the organic oil extraction device 100. On the other hand, once the gas leak sensor 9 confirms that there is no gas leak, the system controller 8 may begin the oil extraction method.

Specifically, the system controller 8 may begin the oil extraction method by preferably activating the valve controller 10, which in turn will preferably open the port valves 11 to release butane liquid through the liquid pressure sensor 12, which may be a valve itself. The liquid pressure sensor 12 generally senses and confirms whether a proper amount of butane liquid and/or pressure is present. If the liquid pressure sensor 12 is a valve, it can ensure the proper pressure before sending the butane liquid to the first chamber 5. Once the liquid pressure sensor 12 confirms that an appropriate amount of butane liquid and/or pressure is present, the liquid pressure sensor 12 may allow the butane liquid to enter into the butane liquid pipe 13 and into the first chamber 5 where the butane liquid mixes with the organic matter 3. In particular, the butane liquid may be released into the first chamber 5, pass through the organic matter 3, and extract oil from the organic matter to create a butane liquid and organic extract 18. Additionally, the butane liquid may extract the oil/resin from the organic material and pass through the filter 4 to allow only the liquid and the extract to proceed through the cap 15. The cap 15 and/or filter 4 preferably prevent the solid plant matter from clogging the butane liquid and organic extract pipe 16. The butane liquid and organic extract 18 may then preferably travel through the butane liquid and organic extract pipe 16, through the second chamber lid 17, and be released inside the second chamber 101. Once deposited into the second chamber 101, the butane liquid and organic extract 18 may gather for a predetermined amount of time regulated by the system controller 8, and during this cycle, the butane portion of the butane liquid and organic extract 18 may change from its liquid to gaseous state, which collects at the bottom of container 101 as a butane liquid and organic extract deposit 19 (i.e., butane hash oil). After the gathering cycle is complete, the system controller 8 may activate the first vacuum pump controller 20 to activate the first vacuum pump(s) 21, which are preferably low level vacuum pump (s). The first vacuum pump(s) 21 generally extract the butane gas 22 that has been accumulating in the second chamber 19 for a predetermined amount of time regulated by the system controller 8. Once this extraction process is complete, the system controller 8 may then activate the heat blanket controller 23, which preferably activates the heat blanket 24 for a predetermined amount of time regulated by the master controller 8. The heat blanket 24 is preferably located around portions of the second chamber 101 and will preferably boil the remaining butane liquid of the butane liquid and organic extract 18 into a gaseous state as butane gas 27. The heat blanket 24 and heat blanket controller 23 may run under direct current and alternating current. After the heat blanket 24 boils the remaining butane liquid, the system controller 8 may activate the second vacuum pump controller 25, which is configured to activate the second vacuum pump(s) 26 in order to remove any residual butane gas 22 from the second chamber 101. The second vacuum pumps 26 may be activated for a predetermined amount of time regulated by the system controller 8. The residual butane gas 22 may then travel through the extracted butane gas pipe 28, through the first vacuum pump 21 and/or second vacuum pump 26 and into the first and second butane gas pipes 29, towards the butane gas pressure and sensor 30, which may be a valve. The butane gas pressure and sensor 30 may sense and verify that proper gas presence/pressure exists and, as a result, allow a small portion of butane gas to enter the gas pilot pipe 31. The system controller 8 may then activate the gas pilot electric igniter 32 until the gas pilot electric igniter 32 ignites a pilot flame 200. The flame sensor 33, which may also be a heat sensor, may confirm proper ignition by the gas pilot electric igniter 32 and presence of the pilot flame 200. After the flame sensor 33 confirms proper ignition, the system controller 8 may activate the butane gas pressure and sensor 30, which may allow the remaining amount of butane gas into the third butane gas pipe 34, and into the butane gas burner 35, where it will cleanly burn off the remaining butane gas. After all of the residual butane gas 22 and butane gas 27 are vacuumed off, what remains is preferably concentrated butane hash oil 19.

In various embodiments, the first chamber 5 of the organic oil extraction device 100 may comprise multiple chambers rather than a single chamber. Similarly, the second chamber 101 may also comprise multiple chambers rather than a single chamber. This may allow the organic oil extraction device 100 to perform multiple oil extraction processes simultaneously.

In various embodiments, the organic oil extraction device 100 and its electronic components (e.g., system controller 8, first vacuum pump controller 20, second vacuum pump controller 25, heat blanket controller 23, heat blanket 24) may run on direct current (e.g., batteries) and/or alternating current (120/240 V AC).

In various embodiments, the organic oil extraction device 100 may lack a pilot flame 200, as this may be a volatile way to boil a flammable liquid. Rather, in some embodiments, the butane gas 27 and residual butane gas 22 may be burned instantaneously by the butane gas burner 35 once the vacuum pumps extract the butane gas from the second chamber.

In a various embodiments, any number of vacuum pumps may be used. For example, the organic oil extraction device may have a single pump. Alternatively, the organic oil extraction device may have multiple pumps such as three, four, or five pumps.

Figure 2:
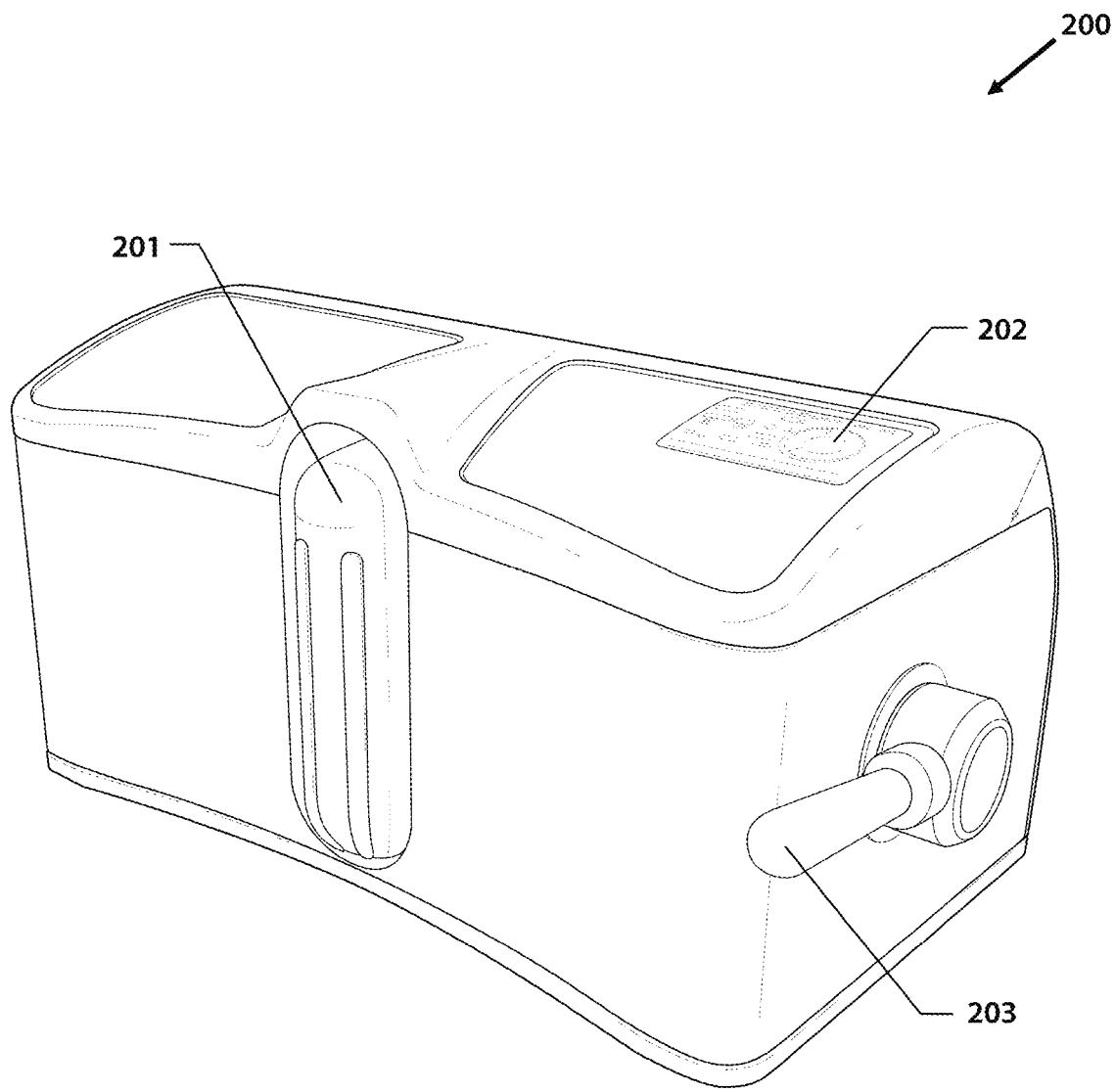
FIG. 2 is an illustration of a top perspective view of another embodiment of the organic oil extraction device.

FIG. 2 is an illustration of a top perspective view of another embodiment of the organic oil extraction device. As shown in FIG. 2, another embodiment of the organic oil extraction device 200 may comprise: a first chamber 201, user interface 202, and a lever 203. As discussed above, the first chamber 201 may be a container used for storing, securing, and/or holding organic matter for the organic oil extraction device 200 and may contain a filter 4. In an embodiment, the first chamber 201 may be shaped as a cylinder, as shown in FIG. 2, and may be removable from the organic oil extraction device 200. The user interface 202 may be a console that contains manual controls for regulating the organic oil extraction device 200 and may comprise one or more buttons and indicators. For example, the user interface 202 may comprise: a start button 7, butane liquid pressure gauge indicator(s), vacuum pump control button(s), heat blanket control button(s), valve control button(s), gas leak indicator(s), butane liquid and organic extract deposit indicator(s), and burner assembly control button(s). The lever 203 may be a rigid bar or handle pivotally connected to the organic oil extraction device 200 and may be used to secure the first chamber 201 into the organic oil extraction device 200. For example, in an embodiment, the lever 203, when pulled up, may allow the first chamber 201 to be released. Additionally, the lever 203, when pulled down, may configure to lock and secure the first chamber 201 in place.

Figure 3:
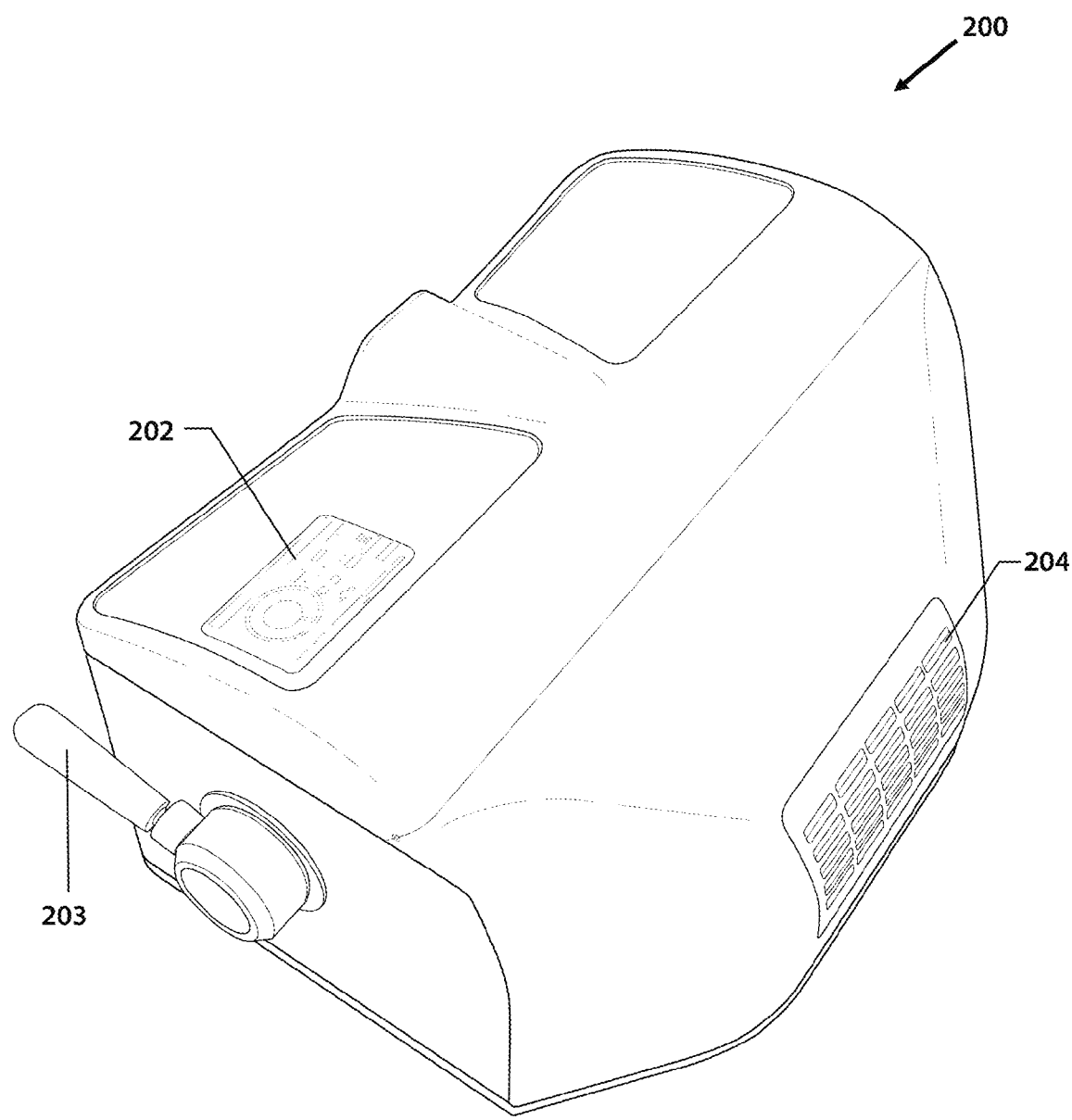
FIG. 3 is an illustration of a rear perspective view of another embodiment of the organic oil extraction device.

FIG. 3 is an illustration of a rear perspective view of another embodiment of the organic oil extraction device. As shown in FIG. 3, another embodiment of the organic oil extraction device 200 may comprise: a user interface 202, a lever 203, and a vent 204. The vent 204 is generally one or more openings that allow heat, gas, and/or exhaust to be released from the burner assembly 102.

Figure 4:
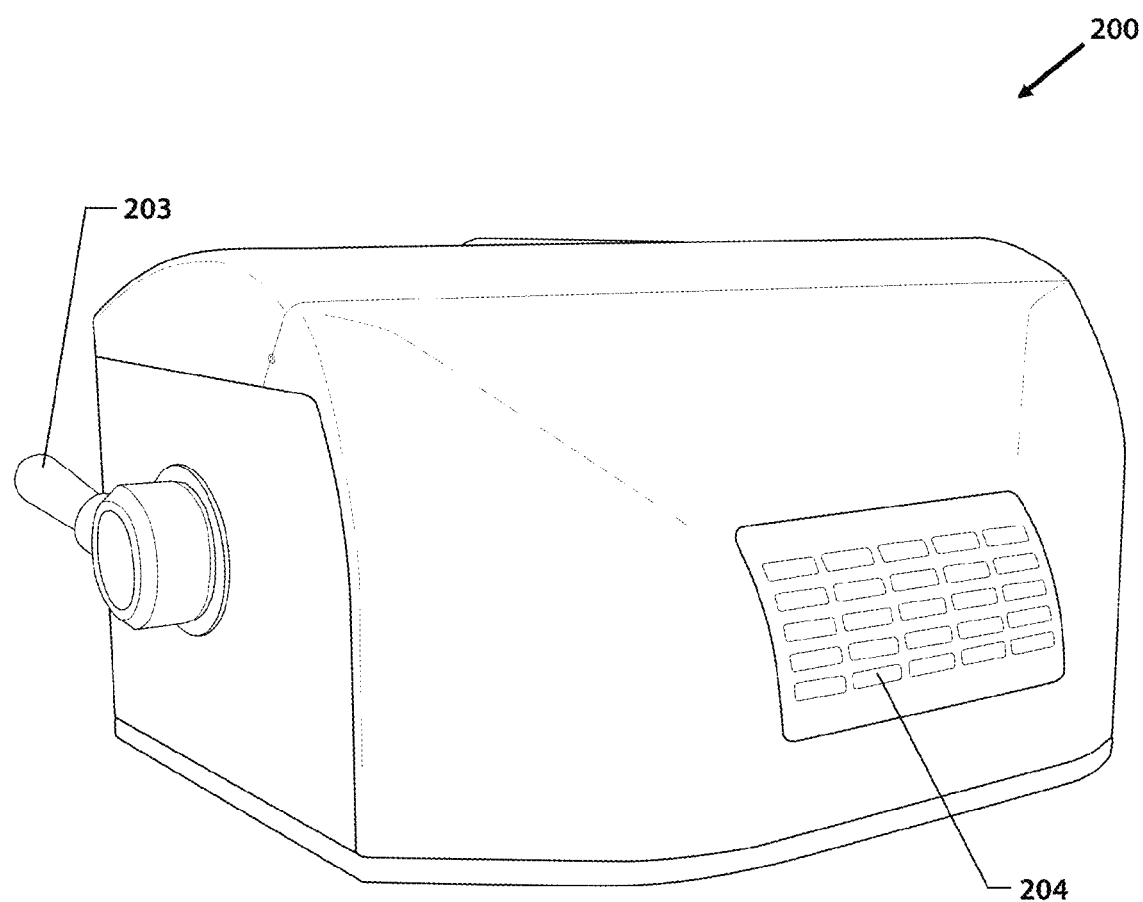
FIG. 4 is an illustration of another rear perspective view of one embodiment of the organic oil extraction device.

FIG. 4 is an illustration of another rear perspective view of one embodiment of the organic oil extraction device. As shown in FIG. 4, another embodiment of the organic oil extraction device 200 may comprise: a lever 203 and a vent 204.

Figure 5:
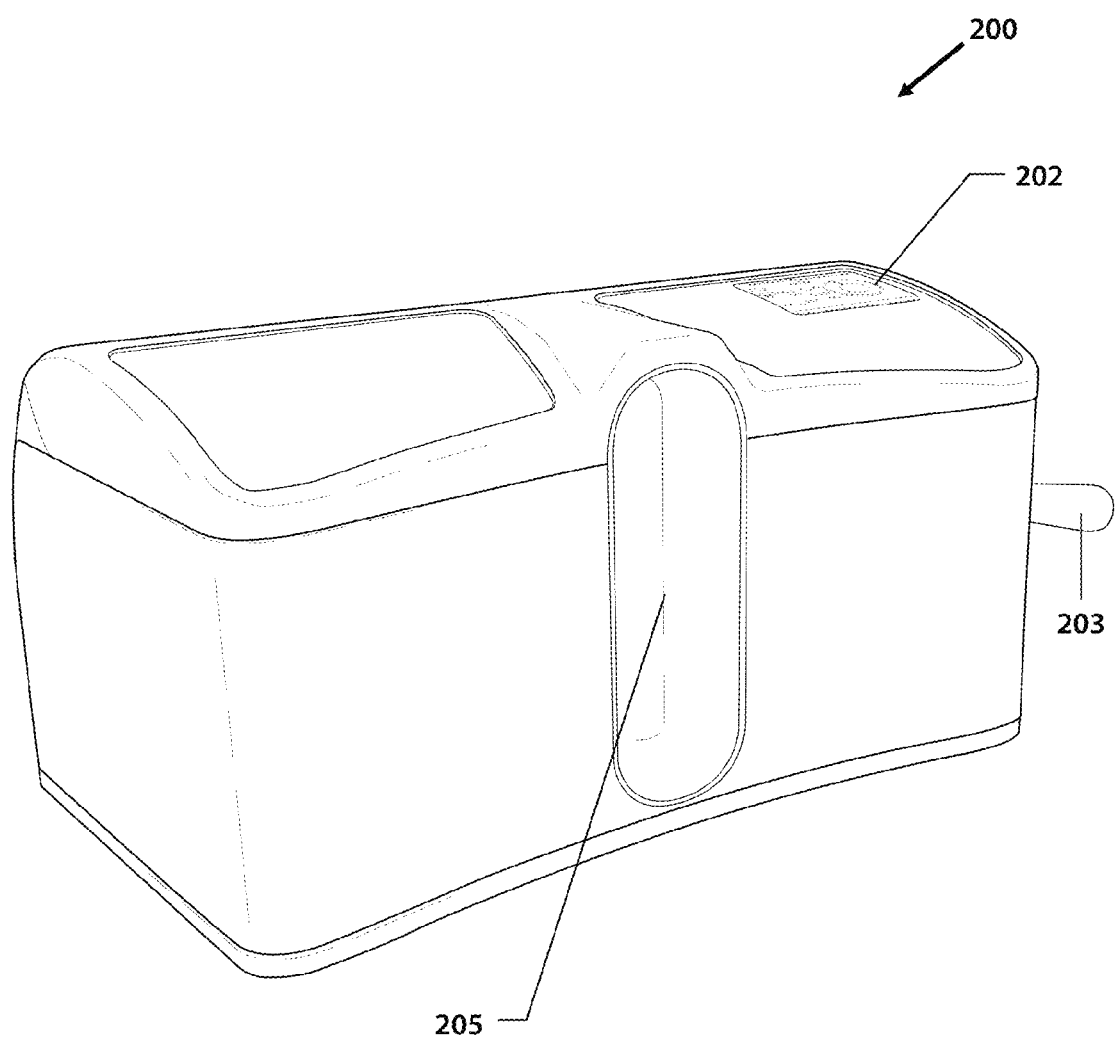
FIG. 5 is an illustration of another top perspective view of another embodiment of the organic oil extraction device.

FIG. 5 is an illustration of another top perspective view of another embodiment of the organic oil extraction device. As shown in FIG. 5, another embodiment of the organic oil extraction device 200 may comprise: a user interface 202, a lever 203, and a cavity 205. The cavity 205 may be an empty space within the organic oil extraction device and may be used for placing the first chamber 201 into the organic oil extraction device 200.

While the foregoing written description enables one of ordinary skill to make and use what is considered presently to be the best mode thereof, those of ordinary skill will understand and appreciate the existence of variations, combinations, and equivalents of the specific embodiment, method, and examples herein. This disclosure should therefore not be limited by the above described embodiment, method, and examples, but by all embodiments and methods within the scope and spirit of the disclosure as claimed.

The foregoing description of the preferred embodiment has been presented for the purposes of illustration and description. While multiple embodiments are disclosed, still other embodiments will become apparent to those skilled in the art from the above detailed description, which shows and describes illustrative embodiments. As will be realized, the embodiments are capable of modifications in various obvious aspects, all without departing from the spirit and scope. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. An organic oil extraction device, comprising:
one or more connection ports;
a first chamber;
a second chamber;
a heat source;
one or more vacuum pumps; and
a burner assembly;
wherein said one or more connection ports are configured to receive one or more sources of pressurized butane liquid;
wherein said first chamber is configured to receive an organic matter and butane liquid from said one or more sources of pressurized butane liquid;
wherein said butane liquid is configured to enter said first chamber, pass through said organic matter, and extract an organic oil from said organic matter to create a butane liquid and organic extract;
wherein said butane liquid and organic extract is configured to enter and accumulate in said second chamber;
wherein said heat source is configured to heat said butane liquid and organic extract such that said butane liquid is converted into a butane gas;
wherein said one or more vacuum pumps are configured to extract said butane gas from said second chamber;
wherein said burner assembly comprises: a pilot; a butane gas sensor; a flame sensor; and a burner;
wherein said burner assembly is configured to burn off said extracted butane gas;
wherein said pilot is configured to ignite a flame when said butane gas sensor detects said extracted butane gas; and
wherein, said burner is configured to burn said extracted butane gas when said flame sensor detects said flame.

2. An organic oil extraction device comprising:
one or more connection ports;
a first chamber;
a second chamber;
a heat source;
one or more vacuum pumps;
a burner assembly;
a gas leak sensor; and
a system controller;
wherein said one or more connection ports are configured to receive one or more sources of pressurized butane liquid;
wherein said first chamber is configured to receive an organic matter and butane liquid from said one or more sources of pressurized butane liquid;
wherein said butane liquid is configured to enter said first chamber, pass through said organic matter, and extract an organic oil from said organic matter to create a butane liquid and organic extract;
wherein said butane liquid and organic extract is configured to enter and accumulate in said second chamber;
wherein said heat source is configured to heat said butane liquid and organic extract such that said butane liquid is converted into a butane gas;
wherein said one or more vacuum pumps are configured to extract said butane gas from said second chamber;
wherein said burner assembly is configured to burn off said extracted butane gas;
wherein said gas leak sensor is configured to detect a gas leak of said butane gas; and
wherein said system controller is configured to shut off said organic oil extraction device when said gas leak sensor detects said gas leak.

3. An organic oil extraction device comprising:
one or more connection ports;
a first chamber;
a second chamber;
a heat source;
one or more vacuum pumps;
a burner assembly;
a liquid pressure sensor; and
a valve controller;

wherein said one or more connection ports are configured to receive one or more sources of pressurized butane liquid;
wherein said first chamber is configured to receive an organic matter and butane liquid from said one or more sources of pressurized butane liquid;
wherein said butane liquid is configured to enter said first chamber, pass through said organic matter, and extract an organic oil from said organic matter to create a butane liquid and organic extract;
wherein said butane liquid and organic extract is configured to enter and accumulate in said second chamber;
wherein said heat source is configured to heat said butane liquid and organic extract such that said butane liquid is converted into a butane gas;
wherein said one or more vacuum pumps are configured to extract said butane gas from said second chamber;
wherein said burner assembly is configured to burn off said extracted butane gas;
wherein said liquid pressure sensor is configured to detect a sufficient amount of said butane liquid at said one or more connection ports;
wherein said one or more connection ports comprise one or more port valves; and
wherein said valve controller is configured to control said one or more port valves to regulate said sufficient amount of said butane liquid to be released to said first chamber.

4. An organic oil extraction device comprising:
one or more connection ports;
a first chamber;
a second chamber;
a heat source;
one or more vacuum pumps; and
a burner assembly;
wherein said one or more connection ports are configured to receive one or more sources of pressurized butane liquid;
wherein said first chamber is configured to receive an organic matter and butane liquid from said one or more sources of pressurized butane liquid;
wherein said butane liquid is configured to enter said first chamber, pass through said organic matter, and extract an organic oil from said organic matter to create a butane liquid and organic extract;
wherein said butane liquid and organic extract is configured to enter and accumulate in said second chamber;
wherein said heat source is configured to heat said butane liquid and organic extract such that said butane liquid is converted into a butane gas;
wherein said one or more vacuum pumps are configured to extract said butane gas from said second chamber;
wherein said burner assembly is configured to burn off said extracted butane gas; and
wherein said heat source is a heat blanket configured to regulate an amount of heat to be emitted in said second chamber.

5. An organic oil extraction device, comprising:
one or more connection ports;
a first chamber;
a second chamber;
a filter;
a heat blanket;
one or more vacuum pumps; and
a burner assembly;
wherein said one or more connection ports are configured to receive one or more sources of pressurized butane liquid;
wherein said first chamber is configured to receive an organic matter and a butane liquid from said one or more sources of pressurized butane liquid;
wherein said butane liquid is configured to enter said first chamber, pass through said organic matter, and extract an organic oil from said organic matter to create a butane liquid and organic extract;
wherein said first chamber comprises said filter for separating said butane liquid and organic extract from said organic matter;
wherein said butane liquid and organic extract is configured to enter and accumulate in said second chamber;
wherein said heat blanket is configured to heat said second chamber and said butane liquid and organic extract such that said butane liquid is converted into a butane gas inside said second chamber;
wherein said one or more vacuum pumps are configured to extract said butane gas from said second chamber;
wherein said one or more controllers are configured to regulate said heat blanket and said one or more vacuum pumps; and
wherein said burner assembly is configured to burn off said extracted butane gas.

6. The organic oil extraction device of claim 5, wherein said burner assembly comprises:
a pilot;
a butane gas sensor;
a flame sensor; and
a burner;
wherein said pilot is configured to ignite a flame when said butane gas sensor detects said extracted butane gas; and
wherein, when said flame sensor detects said flame, said burner is configured to burn said extracted butane gas.

7. The organic oil extraction device of claim 5, further comprising:
a gas leak sensor; and
a system controller;
wherein said gas leak sensor is configured to detect a gas leak of said butane gas; and
wherein said system controller is configured to shut off said organic oil extraction device when said gas leak sensor detects said gas leak.

8. The organic oil extraction device of claim 5, further comprising:
a liquid pressure sensor; and
a valve controller;
wherein said liquid pressure sensor is configured to detect a sufficient amount of said butane liquid at said one or more connection ports;
wherein said one or more connection ports comprise one or more port valves; and
wherein said valve controller is configured to control said one or more port valves to regulate said sufficient amount of said butane liquid to be released to said first chamber.

9. The organic oil extraction device of claim 5, further comprising:
a heat controller;
wherein said heat controller is configured to regulate said heating of said heat blanket.

10. The organic oil extraction device of claim 5, further comprising:
one or more vacuum pump controllers;

wherein said one or more vacuum pump controllers are configured to regulate said extraction of butane gas by said one or more vacuum pumps.

11. The organic oil extraction device of claim 5, wherein said one or more vacuum pumps comprise one or more first vacuum pumps;
wherein said one or more first vacuum pumps are configured to perform said butane gas extraction in said second chamber.

12. The organic oil extraction device of claim 11, wherein said one or more vacuum pumps comprise one or more second vacuum pumps;
wherein said one or more second vacuum pumps are configured to perform a residual butane gas extraction in said second chamber.

13. The oil extraction device of claim 12, wherein said one or more first vacuum pumps are configured to perform said butane gas extraction in said second chamber after a predetermined amount of time;
wherein said heat blanket is configured to heat said butane liquid and organic extract after said one or more first vacuum pumps perform said butane gas extraction; and
wherein said one or more second vacuum pumps are configured to perform said residual butane gas extraction after said heat blanket heats said butane liquid and organic extract.

14. An organic oil extraction device comprising:
one or more connection ports;
a liquid pressure sensor;
a valve controller;
a first chamber;
a second chamber;
a heat blanket;
a heat controller;
one or more vacuum pumps;
one or more vacuum pump controllers;
a burner assembly;
a gas leak sensor; and
a system controller;
wherein said one or more connection ports are configured to receive one or more sources of pressurized butane liquid;
wherein said liquid pressure sensor is configured to detect a sufficient amount of said butane liquid at said one or more connection ports;
wherein said one or more connection ports comprise one or more port valves;
wherein said valve controller is configured to control said one or more port valves to regulate said sufficient amount of said butane liquid to be released to said first chamber;
wherein said first chamber is configured to receive an organic matter and butane liquid from said one or more sources of pressurized butane liquid;
wherein said butane liquid is configured to enter said first chamber, pass through said organic matter, and extract an organic oil from said organic matter to create a butane liquid and organic extract;
wherein said first chamber comprises a filter for separating said butane liquid and organic extract from said organic matter when said butane liquid passes through said organic matter;
wherein said butane liquid and organic extract is configured to enter and accumulate in said second chamber;
wherein said heat blanket is configured to heat said butane liquid and organic extract such that said butane liquid is converted into a butane gas;
wherein said heat controller is configured to regulate said heating of said heat blanket;
wherein said gas leak sensor is configured to detect a gas leak of said butane gas;
wherein said system controller is configured to shut off said organic oil extraction device when said gas leak sensor detects said gas leak;
wherein said one or more vacuum pumps are configured to extract said butane gas from said second chamber;
wherein said one or more vacuum pump controllers are configured to regulate said extraction of butane gas by said one or more vacuum pumps;
wherein said one or more vacuum pumps comprise one or more first vacuum pumps and one or more second vacuum pumps;
wherein said one or more first vacuum pumps are configured to perform said butane gas extraction in said second chamber;
wherein said one or more second vacuum pumps are configured to perform a residual butane gas extraction in said second chamber;
wherein said burner assembly comprises: a pilot; a butane gas sensor; a flame sensor; and a burner;
wherein said pilot is configured to ignite a flame when said butane gas sensor detects said extracted butane gas; and
wherein, said burner is configured to burn said extracted butane gas when said flame sensor detects said flame.

* * * * *